(12) United States Patent
Bae

(10) Patent No.: US 8,009,320 B2
(45) Date of Patent: Aug. 30, 2011

(54) IMAGE FORMING DEVICE CAPABLE OF CONTROLLING AUTO COLOR REGISTRATION AND METHOD OF CONTROLLING AUTO COLOR REGISTRATION

(75) Inventor: Hyo-joon Bae, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 812 days.

(21) Appl. No.: 11/965,052

(22) Filed: Dec. 27, 2007

(65) Prior Publication Data

US 2008/0170277 A1 Jul. 17, 2008

(30) Foreign Application Priority Data

Jan. 11, 2007 (KR) ........................ 10-2007-0003428

(51) Int. Cl.
H04N 1/40 (2006.01)
(52) U.S. Cl. ........................ 358/1.18; 358/500; 358/504
(58) Field of Classification Search .................... 358/2.1, 358/1.3–1.4, 1.7, 1.9, 1.18, 500, 504, 515, 358/518; 347/24, 155, 172, 232
See application file for complete search history.

(56) References Cited

U.S. PATENT DOCUMENTS 6,493,083 B2 * 12/2002 Parisi et al. .................... 356/399
6,989,849 B2 * 1/2006 Nomura et al. ............... 347/133
7,298,350 B2 * 11/2007 Kitazawa et al. ............... 345/76

FOREIGN PATENT DOCUMENTS

| CN | 1253312 A | 5/2000 |
|---|---|---|
| EP | 998128 A2 * | 5/2000 |
| KR | 10-2000-0027725 | 5/2000 |

OTHER PUBLICATIONS

KR Office Action issued Mar. 23, 2011 in KR Application No. 10-2007-0003428.
CN Office Action issued Apr. 1, 2011 in CN Application No. 200810002952.1.

* cited by examiner

*Primary Examiner* — Thomas D Lee
*Assistant Examiner* — Stephen M Brinich
(74) *Attorney, Agent, or Firm* — Stanzione & Kim, LLP

(57) ABSTRACT

An image forming device capable of controlling an auto color registration (ACR) and a method of controlling an ACR. In the image forming device, a sensor detects preliminary test patterns by colors on a conveying belt; a color registration correction unit determines a present alignment state of the respective colors using data detected using colors by the sensor, and judges whether to perform a correction work of relative registration positions of the respective colors on the basis of the result of the determination; and a control unit forms actual test patterns on the conveying belt if it is judged that the correction work should be performed, and controls the sensor and the color registration correction unit to re-detect the data using colors and to perform the correction work.

21 Claims, 4 Drawing Sheets

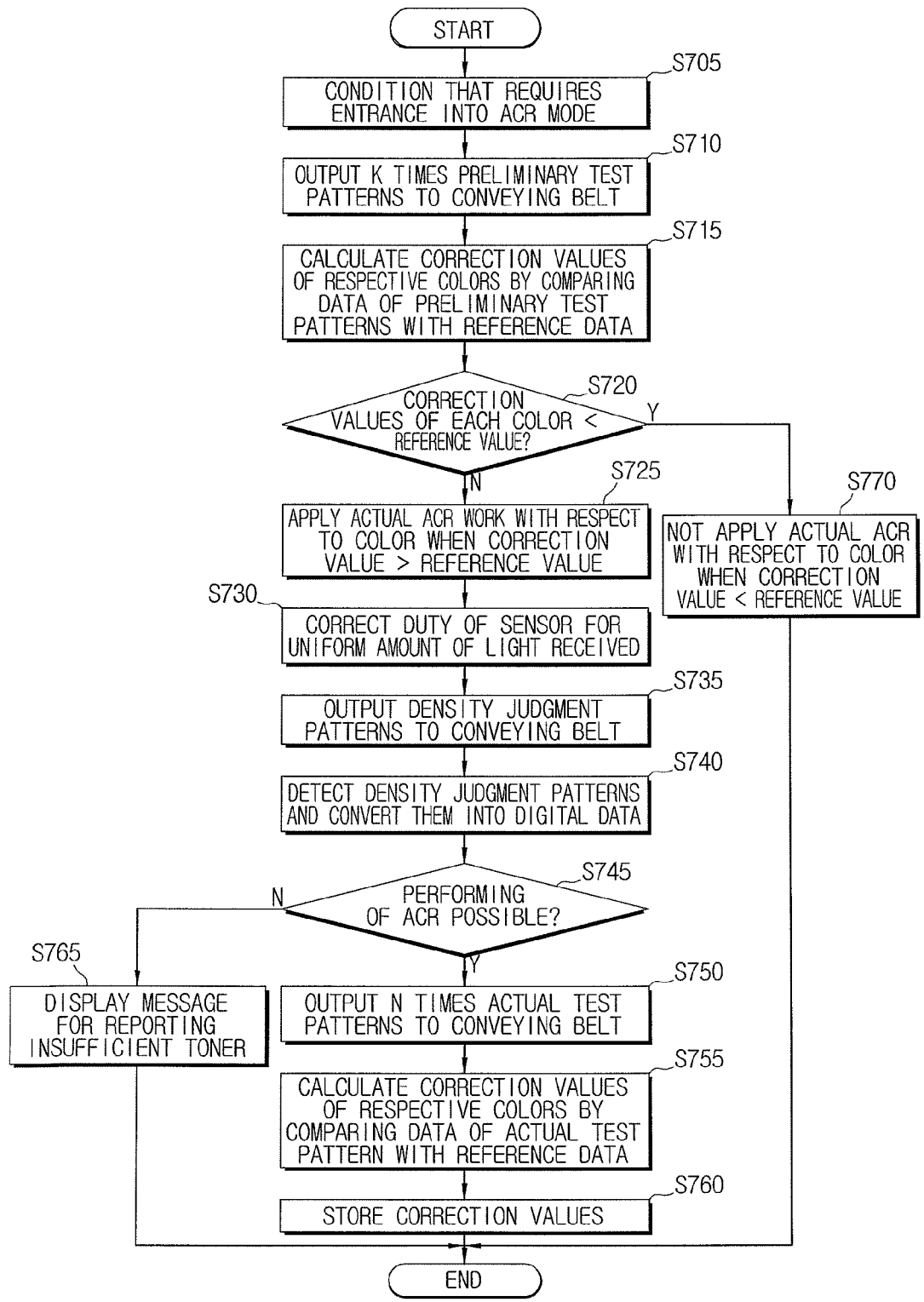

IMAGE FORMING DEVICE CAPABLE OF CONTROLLING AUTO COLOR REGISTRATION AND METHOD OF CONTROLLING AUTO COLOR REGISTRATION

CROSS-REFERENCE TO RELATED APPLICATIONS

This application claims priority under 35 U.S.C. §119(a) from Korean Patent Application No. 2007-3428, filed Jan. 11, 2007, the contents of which are incorporated herein by reference in its entirety.

BACKGROUND OF THE INVENTION

1. Field of the Invention

The present general inventive concept relates to an image forming device capable of controlling an auto color registration and a method of controlling an auto color registration. More particularly, the present general inventive concept relates to an image forming device capable of controlling an auto color registration (ACR) and a method of controlling an ACR, which can perform an ACR work by accurately judging a situation in which the ACR work is required.

2. Description of the Related Art

A color image forming device prints a color image on a printing paper using four colors of yellow, magenta, cyan, and black, and performs an ACR in order to accurately align color registration in a desired position on the printing paper. The ACR work is to correct a relative position where four colors are formed so that images for the four colors are accurately aligned, and as the ACR work is performed, the image quality is improved.

A conventional color image forming device sets conditions that the ACR work is to be performed, and if the present state meets the set conditions, the conventional color image forming device performs the ACR work. For example, the conventional color image forming device performs the ACR work when the temperature change of a laser scanning unit (LSU) exceeds a reference value, when the total number of copies becomes a multiple of the set number of copies, when a cover of the device is opened or closed, and when an article of consumption is replaced. These conditions are determined by experiments in the process of manufacturing the color image forming device.

Accordingly, even when the color registration does not vary from the condition set in the standard specification, the conventional color image forming device performs the ACR work if the present state meets one of the above-described conditions. In other words, the conventional color image forming device performs the ACR work even if the ACR work is not particularly required, and this causes an unnecessary consumption of toner and time, and causes a user who desires to use the image forming device inconvenience.

SUMMARY OF THE INVENTION

The present general inventive concept provides an image forming device capable of controlling an auto color registration (ACR) and a method of controlling an ACR, which can perform an ACR work by accurately judging whether color registration varies from a condition set in the standard specification through performing of a preliminary ACR work.

Additional aspects and utilities of the present general inventive concept will be set forth in part in the description which follows and, in part, will be obvious from the description, or may be learned by practice of the general inventive concept.

The foregoing and other aspects and utilities of the present general inventive concept may be achieved by providing an image forming device capable of controlling an auto color registration (ACR) work, which comprises a sensor to detect preliminary test patterns by colors on a conveying belt; a color registration correction unit to determine a present alignment state of the respective colors using data detected by colors by the sensor, and to judge whether to perform a correction work of relative registration positions of the respective colors on the basis of the result of the determination; and a control unit to form actual test patterns on the conveying belt if it is judged that the correction work should be performed, and to control the sensor and the color registration correction unit to re-detect the data by colors and to perform the correction work.

The color registration correction unit may comprise a pattern output unit to output the preliminary test patterns onto the conveying belt; a correction value calculation unit to determine the present registration state by comparing the data detected by colors by the sensor with reference data, and calculating correction values required to correct relative registration positions of the respective colors on the basis of the result of the determination; and a judgment unit to judge whether to perform the work to actually correct the relative registration positions of the colors by comparing the calculated correction values with a predetermined reference value.

The reference value used in the judgment unit may be in reverse proportion to the number of the preliminary test patterns formed on the conveying belt.

The correction value calculation unit may calculate the correction values by colors, and the judgment unit may judge that it is not required to perform the work with respect to the color of which the calculated correction value is smaller than the predetermined reference value, and it is required to perform the work with respect to the color of which the calculated correction value is larger than the reference value.

The correction value calculation unit may calculate by colors correction values of the respective colors in a main scanning direction, a correction value in a printing paper moving direction, and a correction value of a width between the same colors.

The control unit may make the preliminary test patterns and the actual test patterns be formed on the conveying belt so that the number of the preliminary test patterns formed on the conveying belt becomes smaller than the number of the actual test patterns formed on the conveying belt.

The color registration correction unit may set one of data detected by colors as the reference data, and grasp the present registration state of the respective colors by comparing the set reference data with other data.

The control unit may control the color registration correction unit to judge whether to perform the work by forming the preliminary test patterns on the conveying belt if a developer for proving the respective colors is replaced or a temperature of a laser scanning unit (LSU) to irradiate light during a specified time is changed to the set temperature.

The foregoing and/or other aspects and utilities of the present general inventive concept may also be achieved by providing a method of controlling an auto color registration (ACR) for an image forming device, which comprises detecting preliminary test patterns by colors on a conveying belt; determining a present alignment state of the respective colors using data detected by colors by the sensor, and judging whether to perform a correction work of relative registration positions of the respective colors on the basis of the result of determination; and forming actual test patterns on the conveying belt if it is judged that the correction work should be performed, and controlling the sensor and the color registration correction unit to re-detect the data by colors and to perform the correction work.

The judging may comprise outputting the preliminary test patterns onto the conveying belt; determining the present registration state by comparing the data detected by colors by the sensor with reference data, and calculating correction values required to correct relative registration positions of the respective colors on the basis of the result of grasping; and judging whether to perform the work actually correct the relative registration positions of the colors by comparing the calculated correction values with a predetermined reference value.

The reference value used in the judging may be in reverse proportion to the number of the preliminary test patterns formed on the conveying belt.

The calculating may comprise calculating the correction values by colors, and the judging may judge that it is not required to perform the work with respect to the color of which the calculated correction value is smaller than the predetermined reference value, and it is required to perform the work with respect to the color of which the calculated correction value is larger than the reference value.

The calculating may comprise calculating by colors correction values of the respective colors in a main scanning direction, a correction value in a printing paper moving direction, and a correction value of a width between the same colors.

The judging may comprise setting one of data detected by colors as the reference data, and determining the present registration state of the respective colors by comparing the set reference data with other data.

The foregoing and/or other aspects and utilities of the present general inventive concept may also be achieved by providing an image forming device that can control auto color registration (ACR), comprising: a sensor to sense a first set of patterns of colors on a conveying belt; and a color registration correction unit to determine an alignment state of the respective colors using the result of the sensor, and to judge whether to perform a correction operation of each of the registration positions of the respective colors on the basis of the determination.

The image forming device may further comprise a control unit to control the image forming device to perform an actual color registration correction of each of the colors when it is judged to perform a correction operation of each of the registration positions of the respective. colors.

The control unit can control the image forming device to perform an actual color registration correction of each of the colors by controlling formation of actual test patterns on the conveying belt, controlling the sensor to sense the actual test patterns of colors on the conveying belt and to perform the color registration correction based on the sensing result of the actual test patterns of the colors on the conveying belt.

The foregoing and/or other aspects and utilities of the present general inventive concept may also be achieved by providing a method of controlling an auto color registration (ACR) for an image forming device, the method comprising: sensing a first set of patterns of colors on a conveying belt; and determining an alignment state of the respective colors using the sensing result, and judging whether to perform a correction operation of each of the registration positions of the respective colors on the basis of the determination.

The method may further comprise controlling the image forming device to perform an actual color registration correction of each of the colors when it is judged to perform a correction operation of each of the registration positions of the respective colors.

The controlling of the image forming device to perform an actual color registration correction of each of the colors can be performed by controlling formation of actual test patterns on the conveying belt, controlling the sensing operation to sense the actual test patterns of colors on the conveying belt and to perform the color registration correction based on the sensing result of the actual test patterns of the colors on the conveying belt.

The foregoing and/or other aspects and utilities of the present general inventive concept may also be achieved by providing a recording medium having executable code stored thereon to perform a method of controlling an auto color registration (ACR) for an image forming device, the method comprising: detecting preliminary test patterns by colors on a conveying belt; determining a present alignment state of the respective colors using data detected of the colors by a sensor, and judging whether to perform a correction work of relative registration positions of the respective colors on the basis of the result of the determination; and forming actual test patterns on the conveying belt if it is judged that the correction work should be performed, and controlling the operations of detecting preliminary test patterns by colors and the determining a present alignment state of the respective colors to re-detect the data of the colors and to perform the correction work.

BRIEF DESCRIPTION OF THE DRAWINGS

These and/or other aspects and utilities of the present general inventive concept will become apparent and more readily appreciated from the following description of the exemplary embodiments, taken in conjunction with the accompanying drawings of which:

FIG. 7 is a flowchart illustrating a method of controlling an ACR for an image forming device as illustrated in FIG. 3.

DETAILED DESCRIPTION OF THE PREFERRED EMBODIMENTS

Figure 1:
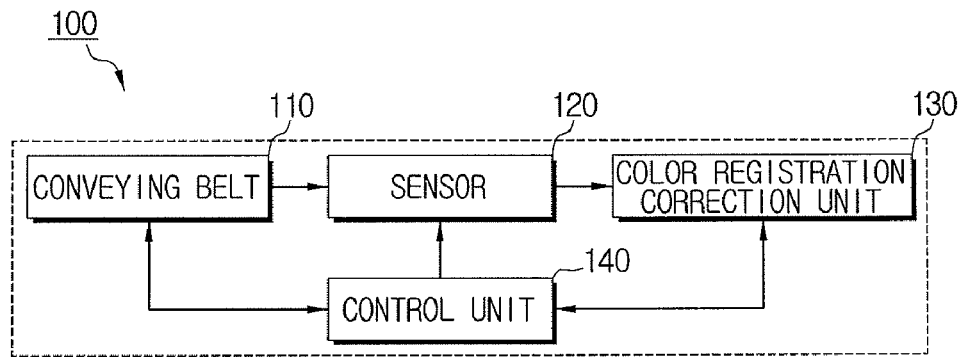
FIG. 1 is a block diagram illustrating the construction of an image forming device capable of controlling an ACR according to an exemplary embodiment of the present general inventive concept.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

FIG. 1 is a block diagram illustrating the construction of an image forming device capable of controlling an ACR according to an exemplary embodiment of the present general inventive concept.

Referring to FIG. 1, the image forming device 100 can include a conveying belt 110, a sensor 120, a color registration correction unit 130, and a control unit 140.

The image forming device 100 is a device that performs a color printing using four colors of yellow, cyan, magenta, and black, and may be a printer, a copy machine, a multifunction device, and so forth.

The conveying belt 110 is a belt to transfer fed printing papers, and in the case of entering into an auto color registration (ACR) preliminary mode, test patterns for an ACR preliminary mode are formed on the surface of the conveying belt 110 in a state that the printing paper does not receive a transferred image thereof.

The ACR is a work to correct relative positions where the four colors are formed to accurately align the four colors on the printing paper, and a preliminary ACR mode is a mode to perform a pre-ACR to judge whether to actually proceed with the ACR. In the case of actually performing the ACR, the test patterns are formed on the surface of the conveying belt 110 N times, and in the case of the preliminary ACR mode, the test patterns are formed K times. Here, it is preferable that K is smaller than N, but it is not limited thereto. The test patterns are formed on the surface of the conveying belt 110 simultaneously or successively, and respective offset values to be described later are successively calculated whenever the test patterns are formed.

The sensor 120 detects the test patterns formed on the conveying belt 110 and outputs the detected data, i.e., voltage values. The voltage values are varied depending on the existence/nonexistence of the test patterns, a motor (not illustrated) to drive the conveying belt 110, and the driving speed of the conveying belt 110.

The color registration correction unit 130 performs the actual ACR work according to the result of preliminary ACR work after the preliminary ACR work is performed. The preliminary ACR work refers to a determination that the color registration correction unit 130 makes from the present registration states of the respective colors using the data detected by the sensor 120 for the respective colors, and corrects the relative registration positions of the respective colors, i.e., a work to judge whether to perform the actual ACR work on the basis of the result of the determination.

For example, if the present registration state of the yellow color is determined to be distorted in comparison to the reference data, the color registration correction unit 130 judges whether to perform the actual ACR work to correct the relative registration position of the yellow color on the basis of the result of determining the present registration state.

More specifically, the color registration correction unit 130 captures the present registration state of a yellow color by comparing the data detected from the text pattern that corresponds to the yellow color with the reference data detected from the text pattern that corresponds to a black color. That is, the color registration correction unit 130 judges how much the yellow color has been distorted on the basis of the black color. If the yellow color has been distorted on the basis of the black color, the color registration correction unit 130 calculates a correction value to correct the degree of distortion, and compares the calculated correction value with the reference value. If the calculated correction value is smaller than the reference value, the color registration correction unit 130 judges that the actual ACR work to actually correct the relative registration position of the yellow color should be performed.

If the color registration correction unit 130 judges that the actual ACR work should be performed, the control unit 140 forms the actual test patterns on the conveying belt 110, controls the sensor 120 to re-detect the data by colors, and controls the color registration correction unit 130 to perform the actual ACR work.

Figure 2:
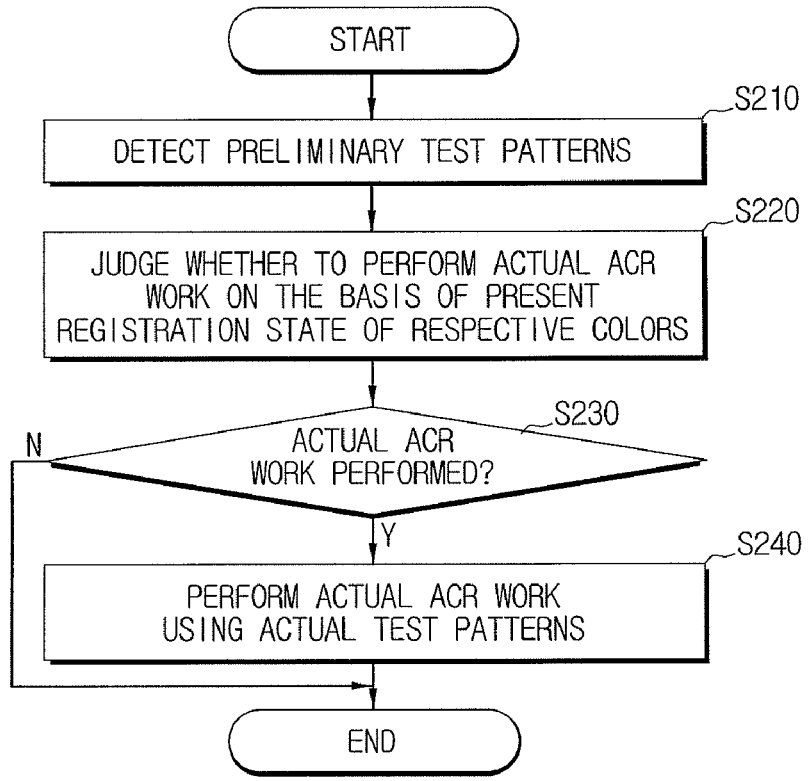
FIG. 2 is a flowchart illustrating a method of controlling an ACR for an image forming device as illustrated in FIG. 1.

FIG. 2 is a flowchart illustrating a method of controlling an ACR for an image forming device as illustrated in FIG. 1.

Referring to FIGS. 1 and 2, the sensor 120 detects the preliminary test patterns formed by colors on the conveying belt 110 (operation S210).

The color registration correction unit 130 determines the present registration state of the respective colors using the data detected by colors, and judges whether to correct the relative registration positions of the respective colors, i.e., whether to perform the actual ACR work, on the basis of the result of the determination (operation S220).

If it is judged that the actual ACR work should be performed as a result of judgment (operation S220), the control unit 140 forms the actual test patterns on the conveying belt 110, and controls the sensor 120 and the color registration correction unit 130 to re-detect the data by colors and to perform the actual ACR work, respectively.

According to the above-described image forming device 100, the control unit 140 judges whether to perform the actual ACR work by performing the preliminary ACR mode. Accordingly, the amount of toner that is consumed whenever the ACR work is performed is reduced, and the unnecessary performing of the ACR is prevented.

Figure 3:
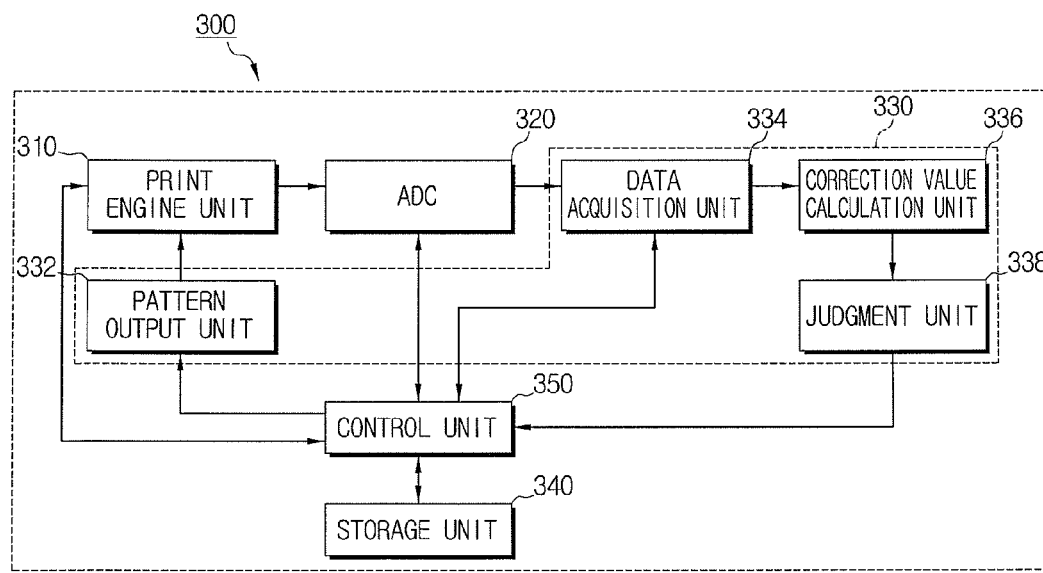
FIG. 3 is a block diagram illustrating the construction of an image forming device capable of controlling an ACR according to another exemplary embodiment of the present general inventive concept.

FIG. 3 is a block diagram illustrating the construction of an image forming device capable of controlling an ACR according to another exemplary embodiment of the present general inventive concept.

Referring to FIG. 3, the image forming device 300 can include a print engine unit 310, an analog-to digital converter (ADC) 320, a color registration correction unit 330, a storage unit 340, and a control unit 350.

The image forming device 300 is a device that can perform a color printing, and may be a printer, a copy machine, a multifunction device, and so forth. The print engine unit 310 is provided with toners of four colors of yellow, cyan, magenta, and black, and forms a color image on the printing paper.

Figure 4:
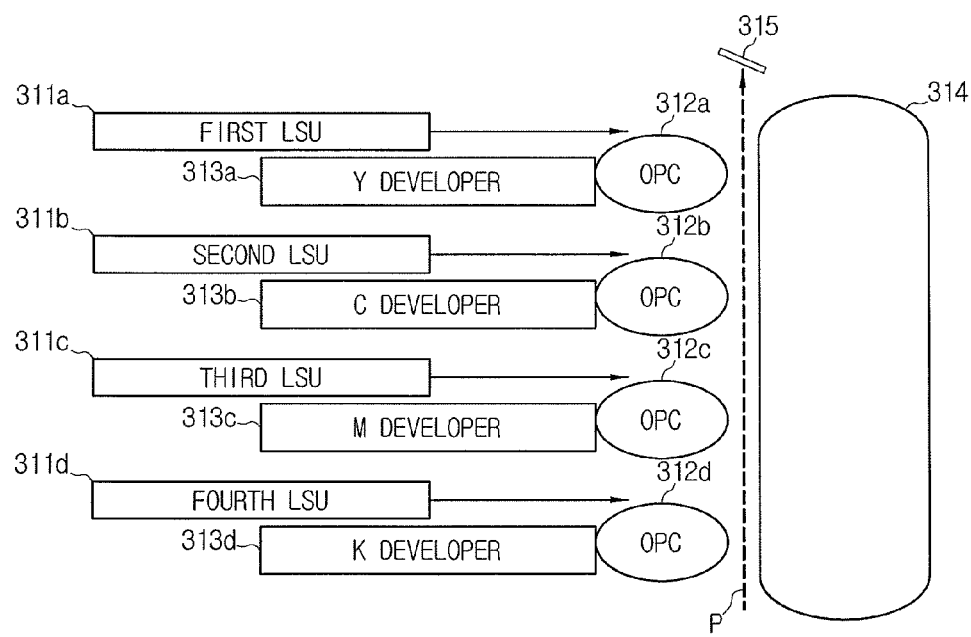
FIG. 4 is a view schematically illustrating a print engine unit as illustrated in FIG. 3.

FIG. 4 is a view schematically illustrating a print engine unit as illustrated in FIG. 3.

Referring to FIG. 4, the print engine unit 310 can include first to fourth laser scanning units (LSUs) 311a, 311b, 311c, and 311d, first to fourth organic photoconducting cartridges (OPCs) 312a, 312b, 312c, and 312d, a Y developer, 313a, C developer 313b, M developer 313c, and K developer 313d, a conveying belt 314, and a sensor 315. In FIG. 4, the print engine unit 310 is illustrated centering around its components related to the present general inventive concept, and the illustration and explanation of other blocks thereof that may obscure the gist of the present general inventive concept will be omitted. In FIG. 4, "P" indicated by dotted line denotes a printing paper moving path.

The first to fourth laser scanning units (LSUs) 311a, 311b, 311c, and 311d are controlled by the control unit 350, and each irradiate light corresponding to the image data transmitted from the control unit 350 onto the first to fourth OPCs 312a, 312b, 312c, and 312d. Accordingly, on the surfaces of the first to fourth OPCs 312a, 312b, 312c, and 312d, electrostatic latent images are formed.

The Y developer 313a is a toner to develop yellow color, the C developer 313b is a toner to develop cyan color, the M developer 313c is a toner to develop magenta color, and the K developer 313d is a toner to develop black color.

The respective developers 313a to 313d develop the latent images formed on the first to fourth OPCs 312a, 312b, 312c, and 312d by the first to fourth LSUs 311a, 311b, 311c, and 311d with the corresponding color toners.

The conveying belt 314 is a belt that is a moving medium of toner images formed on the first to fourth OPCs 312a, 312b, 312c, and 312d, and transfers the toner images of yellow, cyan, magenta, and black, which are formed on the surface of the conveying belt 314 to the printing paper being supplied along the moving path (indicated with dotted line). The conveying belt 314 may be one of a paper transfer belt (PTB) to transfer the toner images directly to the printing paper and an intermediate transfer belt (ITB) that serves as an intermediate medium.

When the image forming device 300 enters into a preliminary ACR mode, preliminary test patterns outputted from the pattern output unit 332 are formed on the surface of the conveying belt 314 K times. Also, when the image forming device 300 enters into an actual ACR mode, density judgment patterns outputted from the pattern output unit 332 are formed on the surface of the conveying belt 314, and the actual test patterns are formed N times. Here, it is preferable that N is larger than K, but it is not limited thereto. The detailed description of the preliminary ACR mode and the actual ACR mode will follow.

The sensor 315 detects the preliminary test patterns, the actual test patterns, or the density judgment patterns formed on the conveying belt 314, and outputs the detected data, i.e., as voltage values. The voltage values are varied depending on the existence/nonexistence of the test patterns, a motor (not illustrated) for driving the conveying belt 314, and the driving speed of the conveying belt 314. The sensor 315 can include a light emitting part (not illustrated) to emit light to the conveying belt 314 and a light receiving part (not illustrated) to receive the light reflected from the conveying belt 314 and convert the received light into a voltage form.

The ADC 320 converts the voltage values outputted from the sensor 315 into digital data. The converted digital data is inputted to the control unit 350 to be used to judge the density of the toners for the respective colors, and is inputted to a data acquisition unit 334 to be used for the ACR work.

The color registration correction unit 330 performs the preliminary ACR work, and then performs the actual ACR work by colors according to the result of the preliminary ACR work. The preliminary ACR work is performed by the color registration correction unit 330 in a manner that the color registration correction unit 330 determines the present registration state of the respective colors using the data detected by colors by the sensor 315, judges whether to perform the actual ACR work on the basis of the result of the determination, and performs the actual work to correct the relative registration positions of the respective colors.

For this, the color registration correction unit 330 comprises a pattern output unit 332, a data acquisition unit 334, a correction value calculation unit 336, and a judgment unit 338.

Figure 5:
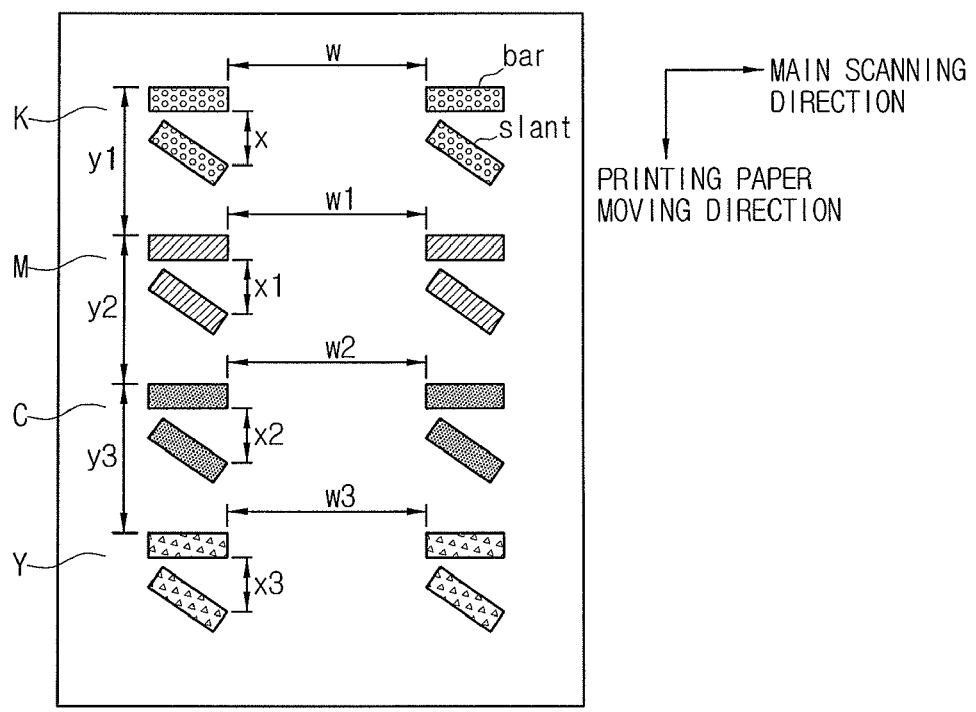
FIG. 5 is a view illustrating an example of test patterns formed on a conveying belt of FIG. 4.

First, in the preliminary ACR mode, the pattern output unit 332 outputs K times the test patterns as illustrated in FIG. 5 to the print engine unit 310 under the control of the control unit 350. The control unit 350 outputs K times a P sync that corresponds to the printing paper moving direction to the pattern output unit 332, and the pattern output unit 332 outputs K times the test patterns to the print engine unit 310. The P sync refers to a page sync, and an L sync refers to a line sync. The respective developers 313a, 313b, 313c, and 313d develop the preliminary test patterns formed on the first to fourth OPCs 312a, 312b, 312c, and 312d with the corresponding colors, respectively, and K test patterns are formed on the conveying belt 314.

Hereinafter, it is assumed that patterns formed on the conveying belt 314 in the preliminary ACR mode are called preliminary test patterns, and patterns formed on the conveying belt 314 in the actual ACR mode are called actual test patterns.

In FIG. 5, patterns hatched by circles (∘) refer to the test patterns formed by black (K) color, patterns hatched by slashes (/) refer to the test patterns formed by magenta (M) color, patterns hatched by dots (•) refer to the test patterns formed by cyan (C) color, and patterns hatched by triangles (Δ) refer to the test patterns formed by yellow (Y) color.

Also, "-"-shaped patterns refer to bar patterns, "\"-shaped patterns refer to slant patterns, a main scanning direction refers to a direction in which the test patterns are formed, and a moving direction refers to a direction in which the printing paper is moved, i.e., a direction in which the conveying belt 314 is driven.

If the conveying belt 314 on which K preliminary test patterns are formed as illustrated in FIG. 5 is rotated by the motor (not illustrated), the sensor 315 irradiates light onto the conveying belt 314, receives the light reflected from the conveying belt 314, and converts the received light into a voltage form.

The ADC 320 converts the voltage converted by the sensor 315 into digital data.

The data acquisition unit 334 acquires data required for the ACR work by colors using the digital data inputted from the ADC 320, and the P sync and the L sync inputted from the control unit 350.

Specifically, if the digital data is inputted, the data acquisition unit 334 acquires data required for the ACR work by colors, x, x1, x2, x3, y1, y2, y3, w, w1, w2, and w3, by counting the number of L syncs on the basis of the P syncs. For example, x denotes a space between the bar pattern formed by K color and the slant pattern, y a space between the bar pattern formed by K color and the bar pattern formed by M color, and w a space between the bar patterns formed by K color, respectively. The respective spaces are expressed by the number of dots.

The correction value calculation unit 336 determines the present registration state of the respective colors by comparing the data by colors x, x1, x2, x3, y1, y2, y3, w, w1, w2, and w3 acquired by the data acquisition unit 334 with the reference data. Then, the correction value calculation unit 336 calculates the correction values required to correct the relative positions of the respective colors on the basis of the result of the determination.

The present registration state represents the degree of distortion of the respective colors on the basis of the reference color in the main scanning direction, the printing paper moving direction and the space between the bar patterns. One color of Y, C, M, and K is used as the reference color, and the data acquired from the reference color among Y, C, M, and K is used as the reference data. In the exemplary embodiment of the present general inventive concept, data x and w of the black (K) color is used as the reference data with respect to the main scanning direction and the space (hereinafter referred to as "width") between the bar patterns, and a pre-stored value is used as the reference data for the printing paper moving direction.

For example, the correction value calculation unit 336 determines the present registration state of the magenta color by comparing magenta data x1, y1, and w1 detected from the preliminary test pattern that corresponds to the magenta color with the reference data x and w detected from the preliminary test pattern that corresponds to the black color that is the reference color. That is, the correction value calculation unit 336 judges how much the magenta color has been distorted on the basis of the black color. Here, the registration state in the printing paper moving direction is obtained by comparing the reference data y' stored in a register (not illustrated) with y1.

Then, if the magenta color has been distorted on the basis of the black color, the correction value calculation unit 336 calculates the correction values to correct the degree of distortion as follows.

First, a method of judging the present registration state of the magenta color in the main scanning direction will be described. The correction value calculation unit 336 judges the degree of distortion of the magenta color on the basis of the main scanning direction, i.e., the current registration state in the main scanning direction, by $(x-x1)=x_{offset}$. Here, x denotes a space between the bar pattern of black color and the slant pattern, and x1 denotes a space between the bar pattern of magenta color and the slant pattern.

If $x_{offset}$ is "0", the correction value calculation unit 336 judges that the magenta color is positioned in the same relative direction on the basis of black color. By contrast, If $x_{offset}$ is larger than "0", the correction value calculation unit 336 judges that the magenta color is positioned on the left side on the basis of the black color, and temporarily stores $x_{offset}$. On the other hand, if $x_{offset}$ is smaller than "0", the correction value calculation unit 336 judges that the magenta color is positioned on the right side on the basis of the black color, and temporarily stores $x_{offset}$.

Since the preliminary test patterns are formed on the conveying belt 314 K times, the correction value calculation unit 336 calculates K $x_{offset}$ values, and calculates an average value of the calculated K $x_{offset}$ values as a correction value "Mx" of magenta color in the main scanning direction.

Second, a method of judging the present registration state of the magenta color in the printing paper moving direction will be described. The correction value calculation unit 336 judges the degree of distortion of the magenta color on the basis of the printing paper moving direction, i.e., the current registration state in the printing paper moving direction, by $(y'-y1)=y_{offset}$. Here, y' denotes reference data pre-stored in a register (not illustrated), and y1 denotes a space between the slant pattern of black color and the slant pattern of magenta color.

If $y_{offset}$ is "0", the correction value calculation unit 336 judges that magenta color is positioned at a predetermined distance from black color. By contrast, If $y_{offset}$ is larger than "0", the correction value calculation unit 336 judges that magenta color is positioned at a distance which is greater than the predetermined distance from black color, and temporarily stores $y_{offset}$ On the other hand, if $y_{offset}$ is smaller than "0", the correction value calculation unit 336 judges that magenta color is positioned at a distance which is shorter than the predetermined distance from black color, and temporarily stores $y_{offset}$.

Since the preliminary test patterns are formed on the conveying belt 314 K times, the correction value calculation unit 336 calculates K $y_{offset}$ values, and calculates an average value of the calculated K $y_{offset}$ values as a correction value "My" of magenta color in the printing paper moving direction.

Third, a method of judging the present registration state of the magenta color with respect to the width between bar patterns of magenta color will be described. The correction value calculation unit 336 judges the present registration state with respect to the width between bar patterns of magenta color by $(w-w1)=w_{offset}$. Here, w denotes a space between the bar pattern of black color and the slant pattern, and w1 denotes a space between the bar patterns of magenta color.

If $w_{offset}$ is "0", w and w1 Xare the same, and thus the correction value calculation unit 336 judges that magenta color is positioned at a correct position on the basis of black color. By contrast, If $w_{offset}$ is larger than "0", the correction value calculation unit 336 judges that the distance between the bar patterns of magenta color is shorter than the distance between the bar patterns of black color, and temporarily stores $w_{offset}$. On the other hand, if $w_{offset}$ is smaller than "0", the correction value calculation unit 336 judges that the distance between the bar patterns of magenta color is larger than the distance between the bar patterns of black color, and temporarily stores $w_{offset}$.

Since the preliminary test patterns are formed on the conveying belt 314 K times, the correction value calculation unit 336 calculates K that the distance between the bar patterns of magenta color is shorter than the distance between the bar patterns of black color, and temporarily stores $w_{offset}$ values, and calculates an average value of the calculated K that the distance between the bar patterns of magenta color is shorter than the distance between the bar patterns of black color, and temporarily stores $w_{offset}$ values as a correction value "Mw" of magenta color with respect to the width of magenta color If the correction value Mx of magenta color in the main scanning direction, the correction value My of magenta color in the printing paper moving direction, and the correction value Mw of magenta color with respect to the width between the bar patterns of magenta color are calculated through the above-described process, the correction value calculation unit 336 calculates correction values Cx, Cy, Cw, Yx, Yy, and Yw with respect to cyan color and yellow color, using the above-described process. That is, the correction value calculation unit 336 calculates by colors the correction values in the main scanning direction, the correction values in the printing paper moving direction, and the correction values with respect to the widths between the same colors.

Here, "Cx" denotes a correction value of cyan color in the main scanning direction, "Cy" a correction value of cyan color in the printing paper moving direction, "Cw" a correction value of cyan color with respect to the width between bar patterns of cyan color, "Yx" denotes a correction value of yellow color in the main scanning direction, "Yy" a correction value of yellow color in the printing paper moving direction, and "Yw" a correction value of yellow color with respect to the width between bar patterns of yellow color, respectively. Since the process of calculating correction values with respect to cyan color and yellow color is the same as the process of calculating correction values with respect to magenta color as described above, the detailed explanation thereof will be omitted.

The correction value calculation unit 336 outputs the calculated correction values Mx, My, Mw, Cx, Cy, Cw, Yx, Yy, and Yw to the judgment unit 338.

The judgment unit 338 compares the calculated correction values Mx, My, Mw, Cx, Cy, Cw, Yx, Yy, and Yw with the reference value, respectively, and judges whether to enter into the actual ACR mode to actually correct the relative registration positions of the respective colors using the result of comparison.

The reference value is obtained as a result of calculating (Distortion limit S in standard specification—permissible error range E), and is used as a reference to judge whether to enter into the actual ACR mode. The standard specification is the specification related to ACR, and the distortion limit S in the standard specification is the permissible color distortion degree in the case where the actual test patterns are formed N times on the conveying belt 314 during the actual ACR work. If the correction values of the respective colors are smaller than the distortion limit S, the color image printed on the printing paper is not greatly unpleasant to the user's eye. This reference value is in reverse proportion to the number of preliminary test patterns formed on the conveying belt 314, but is not limited thereto.

The permissible error range E is obtained by subtracting the distortion limit S in the standard specification from the permissible color distortion limit S' in the case of forming K times the preliminary test patterns on the conveying belt 314 during performing of the preliminary ACR work. For example, if the distortion limit S in the standard specification is found to be 5 dots by experiments in a state that N is 30, the distortion limit S' would be found to be 7 dots by experiments when K is 5.

Accordingly, the judgment unit 338 compares the respective correction values by colors with the reference value, and if three correction values for one color are all smaller than the reference value, it judges that it is not required to perform the actual ACR with respect to the corresponding color. By contrast, if even one of three correction values is larger than or equal to the reference value, the judgment unit 338 judges that the actual ACR should be performed with respect to the corresponding color.

For example, the judgment unit 338 compares the correction values Mx, My, and Mw of magenta color with the reference value, and all of the correction values Mx, My, and Mw are smaller than the reference value, it judges that it is not required to perform the actual ACR with respect to magenta color. By contrast, if any one of the correction values Mx, My, and Mw of magenta color (e.g., Mx) is equal to or larger than the reference value, the judgment unit 338 judges that the actual ACR should be performed with respect to magenta color. This is because the above condition means that the present registration positions of magenta color in the printing paper moving direction and with respect to the width of bar patterns of magenta color are the same as the relative positions on the basis of black color, but the present registration position thereof in the main scanning direction is distorted on the basis of the black color.

If a condition that requires starting the ACR mode is detected after a power of the image forming device 300 is turned on, the control unit 350 controls the print engine unit 310 and the color registration correction unit 330 to enter into the preliminary ACR mode.

The condition that requires starting the ACR mode corresponds to cases where even one of the developers 313a, 313b, 313c, and 313d for providing Y, C, M, and K colors has been replaced, the temperature of the first to fourth LSUs 311a, 311b, 311c, and 311d has been changed by a predetermined temperature range for a specified time, the cover of the image forming device 300 is opened or closed, the total number of copies becomes a multiple of the set number of copies, and the image forming device has woken up after a power save mode is maintained over a specified period of time. If starting the ACR mode is required, the control unit 350 forms the preliminary test patterns on the conveying belt 314, and performs the preliminary ACR work.

Thereafter, if the color registration correction unit 330 judges that the entrance into the actual ACR mode is required, the control unit 350 corrects the duty of the sensor 315 so that the amount of light received in the sensor 315, i.e., the detected voltage level, is maintained constant. Accordingly, the entrance into the actual ACR mode is not affected by the deviation of the conveying belt 314, which occurs due to the fact that the conveying belt 314 is not always moved at a line speed, and the motor (not illustrated) that drives the conveying belt 314 does not form a complete circle.

Figure 6:
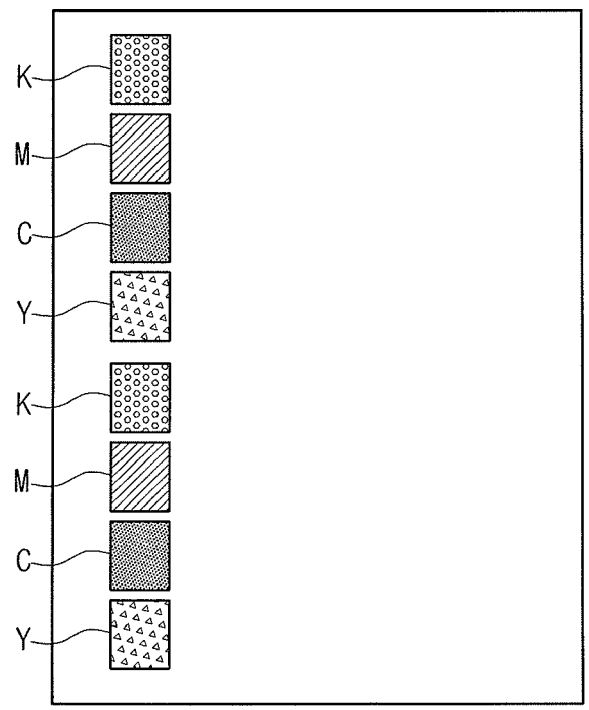
FIG. 6 is a view illustrating an example of density judgment patterns formed on a conveying belt of FIG. 4.

When the duty of the sensor 315 is corrected, the control unit 350 controls the pattern output unit 332 to output the density judgment patterns as illustrated in FIG. 6 to the conveying belt 314. The sensor 315 detects the density judgment patterns formed on the conveying belt 314 and outputs the detected voltage to the ADC 320. The ADC 320 converts the output voltage into digital data and provides the digital data to the control unit 350.

The control unit 350 judges whether the density of toner is enough for the respective developers 313a, 313b, 313c, and 313d to perform the ACR by analyzing the digital data provided from the ADC 320. That is, the control unit 350 judges whether the amount of toner for the respective developers 313a, 313b, 313c, and 313d is enough to perform the ACR.

If it is judged that the density of toner is enough, the control unit 350 forms the actual test patterns on the conveying belt 314, and controls the print engine unit 310 and the color registration correction unit 330 to re-detect the data by colors and to perform the actual ACR work. In the preliminary ACR mode, the control unit 350 controls the pattern output unit 332 to form K times the preliminary test patterns on the conveying belt 314, and in the actual ACR mode, it controls the pattern output unit 332 to form N times the actual test pattern on the conveying belt 314.

By contrast, if it is judged that the density of toner is not enough, the control unit 350 generates a message to report that the toner is insufficient to perform the ACR and displays the generated message on a display panel (not illustrated).

FIG. 7 is a flowchart illustrating a method of controlling an ACR for an image forming device as illustrated in FIG. 3.

Referring to FIGS. 3 to 7, if the condition that requires starting the ACR mode occurs (operation S705), the control unit 350 operates to output K times the preliminary test patterns as illustrated in FIG. 5 to the conveying belt 314 (operation S710).

The sensor 315 detects the preliminary test patterns formed on the conveying belt 314 and outputs the corresponding voltage value, and the ADC 320 converts the output voltage value into digital data. The correction value calculation unit 336 acquires data x, x1, x2, x3, y1, y2, y3, w, w1, w2, and w3 required for the ACR work from the digital data for the respective colors, and calculates the correction values of the respective colors Mx, My, Mw, Cx, Cy, Cw, Yx, Yy, and Yw by comparing the acquired data with the reference data (operation S715).

When operation S715 is performed, the judgment unit 338 compares the calculated correction values Mx, My, Mw, Cx, Cy, Cw, Yx, Yy, and Yw with the reference value, respectively (operation S720). At operation S720, the judgment unit 338 compares the respective corrected values for the colors with the reference value.

If even one of three correction values for one color is larger than or equal to the reference value, the judgment unit 338 judges that the actual ACR should be performed with respect to the color (operation S725).

Then, the control unit 350 corrects the duty of the sensor 315 so that the amount of light received in the sensor 315, i.e., the detected voltage level, is maintained constant (operation S730).

When operation S730 is performed, the control unit 350 controls the pattern output unit 332 to output the density judgment patterns as illustrated in FIG. 6 to the conveying belt 314 (operation S735).

The sensor 315 detects the density judgment patterns formed on the conveying belt 314 and outputs the detected voltage to the ADC 320, and the ADC 320 converts the output voltage into digital data and provides the converted data to the control unit (operation S740).

The control unit 350 judges whether the density of toner is enough for the respective developers 313a, 313b, 313c, and 313d to perform the ACR by analyzing the digital data provided from the ADC 320 (operation S745). If it is judged that the density of toner is enough, the control unit 350 controls the pattern output unit 332 to output N times the actual test patterns to the conveying belt 314 (operation S750).

Then, the control unit 350 controls the print engine unit 310 and the color registration correction unit 330 to re-detect the data by colors and to perform the actual ACR work (operation S755). Specifically, the control unit 350 controls the color registration correction unit 330 to calculate the correction values for the respective colors by comparing the data detected from the actual test patterns with the reference data. The process of calculating the correction values has already been described with reference to FIG. 5, the detailed explanation thereof will be omitted.

Then, the control unit controls the storage unit 340 to store the correction values calculated at operation S755 (operation S760). The correction values for the respective colors stored at operation S760 are used when the actual printing work is performed. That is, the control unit 350 corrects the position of the color by adjusting the sync in the main scanning direction and in the printing paper moving direction by using the stored correction value, and adjusts the width between the same colors by controlling the video clock that adjusts the video data.

By contrast, if it is judged that the density of toner is not enough at operation S745, the control unit 350 generates a message to report that the toner is insufficient to perform the ACR, and displays the generated message on a display panel (not illustrated) (operation S765).

In addition, if three correction values for one color are determined to all be smaller than the reference value (operation S720), the judgment unit 338 judges that it is not required to apply the actual ACR to the color of which the correction values are smaller than the reference value (operation S770).

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains. The methods illustrated in FIGS. 2 and 7 can be stored in the computer-recorded medium in a form of computer-readable codes to perform the method when the computer reads the computer-readable codes of the recording medium.

As described above, according to the image forming devices capable of controlling the ACR and the methods of controlling the ACR according to the various embodiments of the present general inventive concept, the actual ACR work is performed by accurately judging a case that the ACR work is actually required, and thus the unnecessary performing of the ACR work can be prevented.

Also, according to the present general inventive concept, the preliminary ACR work is performed using test patterns the number of which is smaller than that when the actual ACR work is performed, and judges whether to perform the actual ACR work from the result of performing the preliminary ACR work. Accordingly, the unnecessary consumption of toner and the situation that a user is unable to use the print job due to the unnecessary performing of the actual ACR can be prevented.

In addition, according to the present general inventive concept, whether toner is sufficient to perform the actual ACR is judged using the toner density judgment patterns, and thus unnecessary performing of the ACR work can be prevented.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. An image forming device capable of controlling an auto color registration (ACR) work, comprising:
    a sensor to detect preliminary test patterns by colors on a conveying belt;
    a color registration correction unit to determine a present alignment state of the respective colors using data detected of the colors by the sensor, and to judge whether to perform a correction work of relative registration positions of the respective colors on the basis of the result of the determination; and
    a control unit to form actual test patterns on the conveying belt if it is judged that the correction work should be performed, and to control the sensor and the color registration correction unit to re-detect the data of the colors and to perform the correction work.

2. The image forming device of claim 1, wherein the color registration correction unit comprises:
    a pattern output unit to output the preliminary test patterns onto the conveying belt;
    a correction value calculation unit to determine the present registration state by comparing the data detected using the colors by the sensor with reference data, and to calculate correction values required to correct relative registration positions of the respective colors on the basis of the result of the determination; and
    a judgment unit to judge whether to perform the work to actually correct the relative registration positions of the colors by comparing the calculated correction values with a predetermined reference value.

3. The image forming device of claim 2, wherein the reference value used in the judgment unit is in reverse proportion to the number of the preliminary test patterns formed on the conveying belt.

4. The image forming device of claim 2, wherein the correction value calculation unit calculates the correction values by colors; and
    the judgment unit judges that it is not required to perform the work with respect to the color of which the calculated correction value is smaller than the predetermined reference value, and that it is required to perform the work with respect to the color of which the calculated correction value is larger than the reference value.

5. The image forming device of claim 2, wherein the correction value calculation unit calculates by colors correction values of the respective colors in a main scanning direction, a correction value in a printing paper moving direction, and a correction value of a width between the same colors.

6. The image forming device of claim 1, wherein the control unit makes the preliminary test patterns and the actual test patterns be formed on the conveying belt so that the number of the preliminary test patterns formed on the conveying belt becomes smaller than the number of the actual test patterns formed on the conveying belt.

7. The image forming device of claim 1, wherein the color registration correction unit sets one of data detected by colors as the reference data, and determines the present registration state of the respective colors by comparing the set reference data with other data.

8. The image forming device of claim 1, wherein the control unit controls the color registration correction unit to judge whether to perform the work by forming the preliminary test patterns on the conveying belt if a developer to provide the respective colors is replaced or a temperature of a laser scanning unit (LSU) to irradiate light during a specified time is changed from the set temperature.

9. A method of controlling an auto color registration (ACR) for an image forming device, comprising:
    detecting preliminary test patterns by colors on a conveying belt;
    determining a present alignment state of the respective colors using data detected of the colors by a sensor, and judging whether to perform a correction work of relative registration positions of the respective colors on the basis of the result of the determination; and
    forming actual test patterns on the conveying belt if it is judged that the correction work should be performed, and controlling the operations of detecting preliminary test patterns by colors and the determining a present alignment state of the respective colors to re-detect the data of the colors and to perform the correction work.

10. The method of claim 9, wherein the judging comprises:
    outputting the preliminary test patterns onto the conveying belt;
    determining the present registration state by comparing the data detected using the colors by the sensor with reference data, and calculating correction values required to correct relative registration positions of the respective colors on the basis of the result of the determination; and
    judging whether to perform the work to actually correct the relative registration positions of the colors by comparing the calculated correction values with a predetermined reference value.

11. The method of claim 10, wherein the reference value used in the judging is in reverse proportion to the number of the preliminary test patterns formed on the conveying belt.

12. The method of claim 10, wherein the calculating comprises calculating the correction values by colors; and
    the judging judges that it is not required to perform the work with respect to the color of which the calculated correction value is smaller than the predetermined reference value, and that it is required to perform the work with respect to the color of which the calculated correction value is larger than the reference value.

13. The method of claim 10, wherein the calculating comprises calculating by colors correction values of the respective colors in a main scanning direction, a correction value in a printing paper moving direction, and a correction value of a width between the same colors.

14. The method of claim 9, wherein the preliminary test patterns and the actual test patterns are formed on the conveying belt so that the number of the preliminary test patterns formed on the conveying belt becomes smaller than the number of the actual test patterns formed on the conveying belt.

15. The method of claim 9, wherein the judging comprises setting one of data detected by colors as the reference data, and determining the present registration state of the respective colors by comparing the set reference data with other data.

16. The method of claim 9, wherein the detecting comprises detecting the preliminary test patterns by forming the preliminary test patterns on the conveying belt if a developer to provide the respective colors is replaced or a temperature of a laser scanning unit (LSU) to irradiate light during a specified time is changed from the set temperature.

17. An image forming device that can control auto color registration (ACR), comprising:
    a sensor to sense a first set of patterns of colors on a conveying belt;
    a color registration correction unit to determine an alignment state of the respective colors using the result of the sensor, and to judge whether to perform a correction operation of each of the registration positions of the respective colors on the basis of the determination; and
    a control unit to control the image forming device to perform an actual color registration correction of each of the colors when it judged to perform a correction operation of each of the registration positions of the respective colors,
    wherein the control unit controls the image forming device to perform an actual color registration correction of each of the colors by controlling formation of actual test patterns on the conveying belt, controlling the sensor to sense the actual test patterns of colors on the conveying belt and to perform the color registration correction based on the sensing result of the actual test patterns of the colors on the conveying belt.

18. A method of controlling an auto color registration (ACR) for an image forming device, the method comprising:
    sensing a first set of patterns of colors on a conveying belt;
    determining an alignment state of the respective colors using the sensing result, and judging whether to perform a correction operation of each of the registration positions of the respective colors on the basis of the determination;
    controlling the image forming device to perform an actual color registration correction of each of the colors when it is judged to perform a correction operation of each of the registration positions of the respective colors, and
    wherein the controlling of the image forming device to perform an actual color registration correction of each of the colors is performed by controlling formation of actual test patterns on the conveying belt, controlling the sensing operation to sense the actual test patterns of colors on the conveying belt and to perform the color registration correction based, on the sensing, result of the actual test patterns of the colors on the conveying belt.

19. A non-transitory recording medium having executable code stored thereon to perform a method of controlling an auto color registration (ACR) for an image forming device, the method comprising:
    sensing a first set of patterns of colors on a conveying belt;

determining an alignment state of the respective colors using the sensing result, and judging whether to perform a correction operation of each of the registration positions of the respective colors on the basis of the determination; and controlling the image forming device to perform an actual color registration correction of each of the colors when it is judged to perform a correction operation of each of the registration positions of the respective colors.

20. An image forming device to control auto color registration (ACR), comprising:

a color registration module to determine registration positions indicating an alignment state of respective colors included in a set of detected color patterns; and a color correction module to perform an actual color registration correction of each of the respective colors based on the alignment state of the respective colors, wherein the color registration module determines the registration positions based on a plurality of preliminary test patterns, and wherein the actual color registration correction includes calculating correction values of the respective colors based on a plurality of actual test patterns that are different from the plurality of preliminary test patterns.

21. The image forming apparatus of claim 20 wherein the plurality of preliminary test patterns are generated prior to performing the actual color registration correction.

* * * * *